United States Patent
Anderson et al.

(10) Patent No.: US 8,935,799 B1
(45) Date of Patent: Jan. 13, 2015

(54) REPORT GENERATION SYSTEM AND METHOD

(75) Inventors: William S. Anderson, Independence, MO (US); Richard R. Braun, Pleasant Hill, MO (US); Arthur Glass, Jr., Overland Park, KS (US); Nancy J. Morris, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 190 days.

(21) Appl. No.: 13/598,590

(22) Filed: Aug. 29, 2012

(51) Int. Cl.
  *G06F 21/00* (2013.01)
  *G06F 21/62* (2013.01)

(52) U.S. Cl.
  CPC ........ *G06F 21/6218* (2013.01); *G06F 21/6227* (2013.01); *G06F 21/62* (2013.01)
  USPC .................................. 726/26; 726/19; 726/28

(58) Field of Classification Search
  None
  See application file for complete search history.

(56) References Cited

U.S. PATENT DOCUMENTS

| | | | |
|---|---|---|---|
| 7,051,038 B1* | 5/2006 | Yeh et al. | 707/603 |
| 7,356,840 B1* | 4/2008 | Bedell et al. | 726/13 |
| 2005/0267868 A1* | 12/2005 | Liebl et al. | 707/2 |
| 2010/0030737 A1* | 2/2010 | Scheuber-Heinz et al. | 707/3 |
| 2010/0325161 A1* | 12/2010 | Rutter et al. | 707/783 |
| 2011/0270833 A1* | 11/2011 | von Kaenel et al. | 707/736 |
| 2013/0161384 A1* | 6/2013 | Hanson et al. | 235/379 |

* cited by examiner

*Primary Examiner* — Andrew Nalven
*Assistant Examiner* — Christopher Ruprecht (57) ABSTRACT

A report generation system is provided. The system comprises at least one data generator that generates data, a data store that comprises the data, a computer system, and a reporting engine. The reporting engine receives a request to generate a report from a client device, applies a first pre-established filter to the data based on credentials associated with a user of the client device to isolate a subset of the data, and applies a second pre-established filter to the subset of the data based on the credentials associated with the user of the client device to isolate a report generation set of data. The reporting engine further generates the report using the report generation set of data from the data store based on user-defined criteria and pre-established default criteria and outputs the report to the client device.

20 Claims, 7 Drawing Sheets

REPORT GENERATION SYSTEM AND METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Enterprises may collect large volumes of data, such as production data, for their customers as well as for internal analysis. In response to a request from a customer, the enterprise may provide relevant production data to the requesting customer in the form of a report.

SUMMARY

In an embodiment, a report generation system is disclosed. The system comprises at least one data generator that generates data, a data store that comprises the data, and a computer system that comprises at least one memory and at least one processor. The system further comprises a reporting engine stored in the at least one memory that, when executed by the at least one processor, receives a request to generate a report from a client device, applies a first pre-established filter to the data based on credentials associated with a user of the client device to isolate a subset of the data, and applies a second pre-established filter to the subset of the data based on the credentials associated with the user of the client device to isolate a report generation set of data. The report generation set of data is another subset of the subset of the data. The reporting engine, when executed by the at least one processor, further generates the report using the report generation set of data from the data store based on user-defined criteria and pre-established default criteria and outputs the report to the client device.

In an embodiment, a computer-implemented method for generating a report is disclosed. The method comprises receiving, by a reporting engine stored in at least one non-transitory computer readable medium and executable by at least one processor, a request to generate a report from a client device, applying, by the reporting engine, a first pre-established filter to data in a data store based on credentials associated with a user of the client device to isolate a subset of the data, and applying, by the reporting engine, a second pre-established filter to the subset of the data based on the credentials associated with the user of the client device to isolate a report generation set of data. The report generation set of data is another subset of the subset of the data. The method further comprises generating, by the reporting engine, the report using the report generation set of data from the data store based on user-defined criteria and pre-established default criteria and outputting, by the reporting engine, the report to the client device.

In an embodiment, a report generation system is disclosed. The system comprises at least one data generator that generates data, a data store that comprises the data, and a computer system that comprises at least one memory and at least one processor. The system further comprises a reporting engine stored in the at least one memory that, when executed by the at least one processor, receives a request to generate a report from a client device, applies a plurality of pre-established filters to the data based on credentials associated with a user of the client device to isolate a report generation set of data, determines available memory for processing the request to generate the report, and determines an amount of memory needed to process the request to generate the report. When the amount of memory needed to process the request to generate the report exceeds the available memory, the reporting engine delays the request to generate the report and finishes processing pending requests to generate reports. When the pending requests to generate the reports are processed, the reporting engine processes the request to generate the report. When the amount of memory needed to process the request to generate the report is less than or equal to the available memory, the reporting engine processes the request to generate the report. The reporting engine, when executed by the at least one processor, further generates the report using the report generation set of data from the data store based on user-defined criteria and pre-established default criteria and outputs the report to the client device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In traditional report generation systems, data from a data store may be cached in a file. The file may be updated with data from the data store relatively infrequently, such as once a day for example. In response to a request from a customer, an enterprise may provide relevant cached production data from the file to the requesting customer in the form of a report rather than accessing the data store directly, thereby resulting in less up-to-date data in the report. Furthermore, in traditional report generation systems, there may be little to no limits placed on the generation of the report, which often lead to the overloading and crashing of the traditional report generation system. For example, users may choose to receive reports covering all of the cached data from the file rather than selective data, thereby unnecessarily loading the tradition report generation system.

The present disclosure is directed to a report generation system and method. The report generation system and method disclosed herein provides reports with more up-to-date data than traditional report generation systems by accessing a data store that stores data which is loaded into the data store in near real time and generating a report using such near real time data. In an embodiment, a reporting engine may receive a request to generate a report from a client device. In order to determine which data from the data store is allowed to be returned in the requested report, the reporting engine may apply two tiers of filtering based on credentials associated with a user of the requesting client device, such as the user's Windows authentication. For example, the reporting engine may apply a first pre-established filter to the data in the data store based on credentials associated with the user of the requesting client device to isolate a subset of the data from the data store. Next, the reporting engine may apply a second pre-established filter to the subset of the data based on the credentials associated with the user of the requesting client device to isolate a report generation set of data.

Once the report generation set of data is isolated, the reporting engine may generate the report using the report generation set of data from the data store based on user-defined criteria and pre-established default criteria. In an embodiment, the pre-established default criteria are created by a system administrator and comprise 100,000 rows of data or less in the generated report and thirty minutes or less of processing time to generate the report. Applying such pre-established default criteria enables the disclosed report generation system to operate more smoothly and efficiently than traditional report generation systems.

In an embodiment, the reporting engine predicts in advance the resources that will be consumed before they are committed to enable a decision as to when to actually process the request to generate the report. In particular, prior to actually generating the report, the reporting engine may apply a memory check to determine when to actually process the request to generate the report. For example, the reporting engine may determine the available memory for processing the request to generate the report and the amount of memory needed to process the request to generate the report. The reporting engine may compare those two determined amounts and use such a comparison to determine when to process the request to generate the report. For instance, when the amount of memory needed to process the request to generate the report exceeds the available memory, the reporting engine may delay the request to generate the report, finish processing pending requests to generate reports, and when the pending requests to generate the reports are processed, the reporting engine may then process the request to generate the report. Alternatively, when the amount of memory needed to process the request to generate the report is less than or equal to the available memory, the reporting engine may process the request to generate the report. Implementing a memory check in the disclosed report generation system and method prior to processing a request to generate a report may also help to keep the disclosed report generation system operating smoothly and efficiently.

Figure 1:
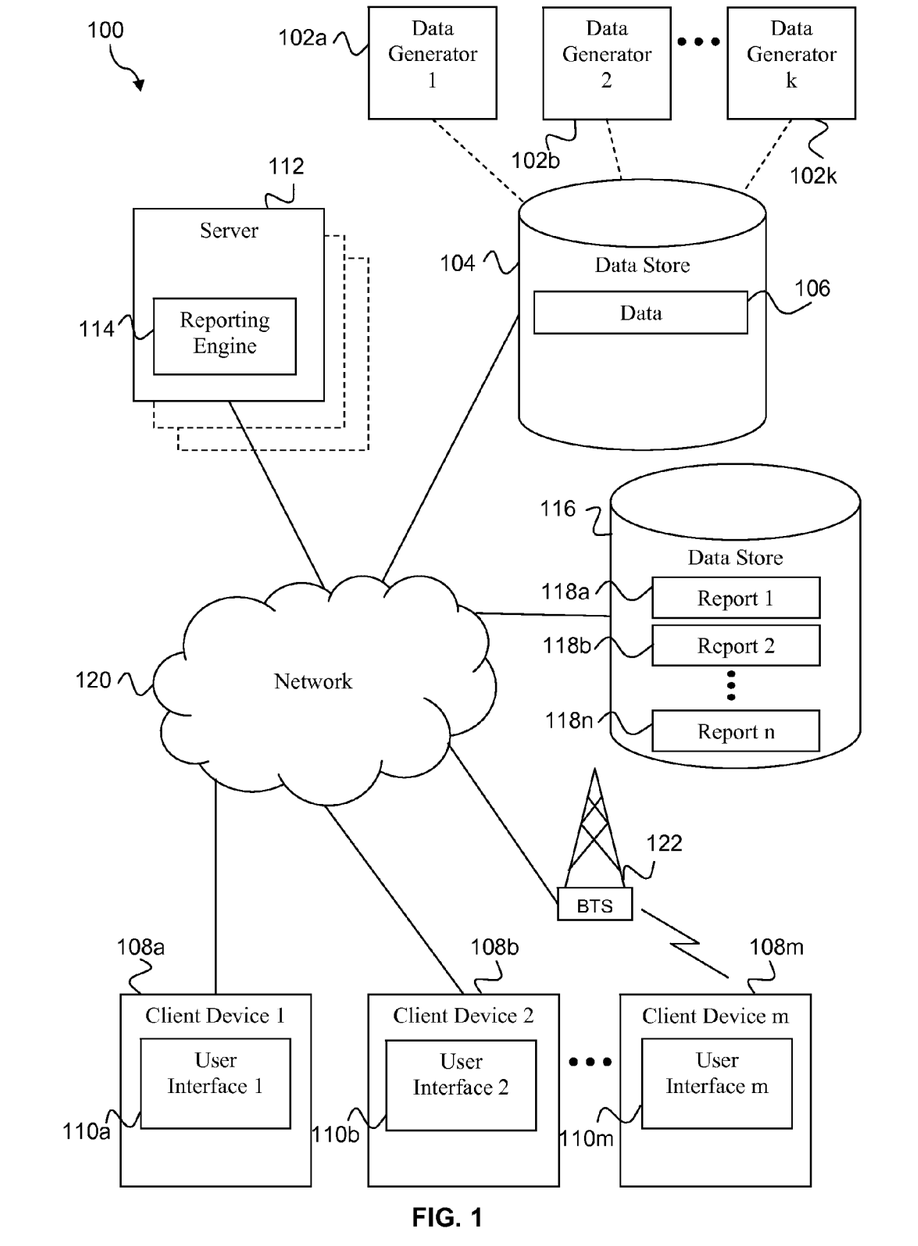
FIG. 1 is a block diagram of a report generation system according to an embodiment of the disclosure.

Turning now to FIG. 1, a report generation system 100 is described. In an embodiment, the system 100 comprises a plurality of data generators 102a-102k, a data store 104, a plurality of client devices 108a-108m, a server 112, a reporting engine 114, a reports data store 116, a network 120, and a base transceiver station 122. In some contexts herein, the plurality of data generators 102a-102k and the plurality of client devices 108a-108m may be referred to as the data generators 102 and the client devices 108, respectively.

The data generators 102 may be general purpose computers, which are described in greater detail hereinafter with respect to FIG. 7. Each of the data generators 102 may generate data, such as production data. In an embodiment, the data generators 102 may be independent, for example the data generators 102 may be associated with different enterprise applications that execute on different server computers or on different clusters of server computers. In an embodiment, production data for a telecommunications provider may include internal tickets, tracking of internal tickets, information on outages, call detail records (CDRs), billing information, as well as other data. The generated data 106 may be stored in data store 104 for later use. While illustrated as being stored in a single data store 104, one of ordinary skill in the art will appreciate that the generated data 106 may be stored in a plurality of data stores without departing from the scope of the disclosure. Additionally, while the generators 102 are illustrated in FIG. 1 as being linked to the data store 104, this link may be an indirect link as illustrated by the dashed line. For example, the generated data may be provided to the data store 104 via the network 120.

In an embodiment, the data generated by the data generators 102 are loaded to the data store 104 in near real time. Near real time in the context of the pending disclosure where a human being (e.g., a customer, a manager, a supervisor, etc.) is the ultimate destination for the information may be fifteen minutes or less, ten minutes or less, or five minutes or less. As will be discussed in greater detail below, the generated data 106 is used to generate reports. Since the data generated by the data generators 102 is loaded to the data store 104 in near real time and used to generate reports, the data in the reports may be more current than in traditional systems where the data from the data store is cached in a file, the file is updated with data from the data store relatively infrequently, and reports are generated using the cached data in the file. Generating reports with more up-to-date data may result in increased customer satisfaction.

The client devices 108 may be general purpose computers, which are described in greater detail hereinafter with respect to FIG. 7. Specifically, the client devices 108 may be a desktop computer, laptop computer, tablet computer, mobile telephone, personal digital assistant (PDA), portable electronic device, or another network enabled electronic device. A mobile device, such as a mobile telephone, a personal digital assistant (PDA), or a portable electronic device, is described in greater hereinafter with respect to FIGS. 4-6.

In an embodiment, the client devices 108 comprise user interfaces 110a-110m. In some contexts herein, the plurality of user interfaces 110a-110m may be referred to as the user interfaces 110. A user of one of the client devices 108 may request the generation of a report via the corresponding user interface 110. For example, a user of one of the client devices 108 may request the generation of a report on the fly or may schedule the generation of a report via the corresponding user interface 110. When a report is requested to be generated on the fly, the report may be generated immediately (e.g., just subsequent to the request). In contrast, when a report is requested to be generated according to a schedule, the report may be generated once at a later time or periodically at later times depending on the request. In an embodiment, a user of one of the client devices 108 limits the data returned in the report by using the corresponding user interface 110 to specify user-defined criteria. User-defined criteria may comprise a format of the report, a date range, a start date, an end date, or other criteria. In an embodiment, the format of the report comprises one of Excel, Word, and Portable Document File (PDF).

The server 112 may be a general purpose computer. As mentioned above, general purpose computers are described in greater detail hereinafter with respect to FIG. 7. In an embodiment, the server 112 comprises the reporting engine 114. The dashed boxes behind server 112 in FIG. 1 illustrate that the reporting engine 114 may execute on more than one server 112. In an embodiment, the reporting engine 114 receives a request to generate a report from one of client devices 108.

In response to receiving the request to generate a report from one of the client devices 108, the reporting engine 114 may apply two tiers of filtering to the data 106 stored in data store 104 based on credentials associated with a user of the requesting client device, such as client device 108a, to determine what data from the data 106 in the data store 104 the client device 108a is able to access and/or what data from the data 106 in the data store 104 is eligible to be returned in the report. For example, the reporting engine 114 may apply a first pre-established filter to the data 106 based on credentials associated with the user of the client device 108a to isolate a subset of the data 106. Next, the reporting engine 114 may apply a second pre-established filter to the subset of the data based on the credentials associated with the user of the client device 108a to isolate a report generation set of data. The second pre-established filter defines or isolates what data from the subset created by applying the first pre-established filter is able to be accessed by the client device 108a and/or returned in the report.

Thus, the two tiers of filtering applied by the reporting engine 114 based on credentials associated with a user of the requesting client device 108a, 108b, or 108m produces a report generation set of data, which can be used to generate the requested report. Thinking about it in different terms, the two tiers of filtering applied by the reporting engine 114 may exclude access to at least some of the data 106 in the data store 104 (e.g., the data of data 106 that is not included in the report generation set of data) based on the credentials associated with the user of the requesting client device 108a, 108b, or 108m.

Thus, for example, the reporting engine 114 may apply one set of pre-established filters for a vice-president based on the vice-president's credentials to isolate the report generation set of data for the vice-president and another set of pre-established filters for a lower level manager based on the lower level manager's credentials to isolate the report generation set of data for the lower level manager. In an embodiment, the report generation set of data for the vice-president is different than the report generation set of data based on their respective credentials. In another example, the reporting engine 114 may apply one set of pre-established filters for an enterprise employee based on the enterprise employee's credentials to isolate the report generation set of data for the enterprise employee and another set of pre-established filters for a vendor employee based on the vendor employee's credentials to isolate the report generation set of data for the enterprise employee. As with the first example, the report generation set of data for the enterprise employee may be different than the report generation set of data for the vendor employee based on their respective credentials.

In an embodiment, the reporting engine 114 uses the user's Windows authentication as the credentials used to determine which pre-established filters to apply to the data 106 in the data store 104 to isolate the report generation set of data. Alternatively, an ID, password, or another type of credential associated with the user of the requesting client device 108a, 108b, or 108m may be used to determine which pre-established filters to apply to the data 106 in the data store 104 to isolate the report generation set of data.

Prior to actually generating the report, the reporting engine 114 may perform a memory check to determine when to actually process the request to generate the report. For example, the reporting engine 114 may determine the available memory for processing the request to generate the report. The reporting engine 114 may also determine the amount of memory that is estimated will be used to process the request to generate the report. In an embodiment, when the amount of memory estimated to be needed to process the request to generate the report exceeds the available memory, the reporting engine 114 delays the request to generate the report and finishes processing pending requests to generate reports. When the pending requests to generate the reports are processed, then the reporting engine 114 may process the request to generate the report. In an embodiment, when the amount of memory needed to process the request to generate the report is less than or equal to the available memory, the reporting engine 114 processes the request to generate the report. Implementing a memory check as described above prior to processing a request to generate a report may also help to keep the report generation system 100 operating smoothly and efficiently.

The reporting engine 114 may generate the report using the report generation set of data from the data store 104 based on user-defined criteria and pre-established default criteria. In an embodiment, user-defined criteria may be inputted by a user of one of the client devices 108 via the corresponding user interface 110. As discussed above, user-defined criteria may comprise a format of the report (e.g., Excel, Word, PDF, etc.), a date range, a start date, an end date, or other criteria. In an embodiment, the pre-established default criteria are created by a system administrator. The pre-established default criteria may comprise 100,000 rows of data or less in the generated report and/or thirty minutes or less of processing time to generate the report. In an embodiment, the pre-established default criteria are applied to enable the reporting engine 114 to function smoothly and efficiently. In contrast, traditional systems did not impose such processing constraints on the generation of reports, which sometimes lead to the overloading and crashing of the traditional report generation system.

After the report is generated using the report generation set of data from the data store 104 based on user-defined criteria and pre-established default criteria, the reporting engine 114 may output the report to the requesting client device 108a, 108b, or 108m. If the requested report does not comply with at least one of the pre-established default criteria (e.g., has more than 100,000 rows of data or takes more than thirty minutes of processing time to generate), the reporting engine 114 may still generate and return a report to the requesting client device 108a, 108b, or 108m. However, in such a case, the generated report may be truncated and the requesting client device 108a, 108b, or 108m may be notified that the generated report is incomplete. A user of one of the client devices 108 may then request expanded pre-established default criteria. For example, the user may request more than 100,000 rows of data and/or more than thirty minutes of processing time to generate the report. A system administrator may individually grant or deny such requests depending on the particular circumstances.

A user of the requesting client device 108a, 108b, or 108m may view the generated report as well as all of their previously generated reports in the corresponding user interface 110. In an embodiment, the user of the requesting client device 108a, 108b, or 108m can save the generated report locally to the requesting client device 108a, 108b, or 108m. In addition to or in lieu of saving the generated report locally, the generated report may be stored in a reports data store 116. In an embodiment, the reports data store 116 may store the generated reports 118a, 118b, and 118n (e.g., report 1, report 2, and report n) for each of the plurality of client devices 108. While illustrated as two separate data stores, the data store 104 and the reports data store 116 may instead be a single data store that stores the data 106 as well as the generated reports 118a, 118b, and 118n.

In addition to outputting the generated report to the requesting client device 108a, 108b, or 108m, the reporting engine 114 may also send a notification via email to the requesting client device 108a, 108b, or 108m. In an embodiment, the notification comprises a link to the generated report.

In an embodiment, the requesting client device 108a, 108b, or 108m is configured to send the generated report to a user of another client device. For example, using the corresponding interface 110, a user of the requesting client device 108a, 108b, or 108m may indicate one or more individuals with which to share the generated report. Also, using the corresponding interface 110, the user of the requesting client device 108a, 108b, or 108m may indicate the access rights that the one or more individuals has to the sent report. Access rights may comprise read/write access or read only access. For example, the user of the requesting client device 108a, 108b, or 108m may indicate that one individual has read/write access to the report while another individual has read only access to the report. The ability to share the generated report with other individuals or client devices may avoid regeneration of reports, thereby reducing the processing load placed on the report generation system 100.

The reporting engine 114 may revoke a user's access to their generated reports stored in data base 116. For example, if a user changes jobs within the company or leaves the company all together, the reporting engine 114 may revoke that user's access to their previously generated reports. Additionally, the reporting engine 114 may transfer all of that user's previously generated reports to another individual.

The network 120 promotes communication between the components of the system 100. The network 120 may be any communication network including a public data network (PDN), a public switched telephone network (PSTN), a private network, and/or a combination.

The base transceiver station 122 may be any of a cellular wireless base station, for example a Code Division Multiple Access (CDMA), a Global System for Mobile Communications (GSM), a Universal Mobile Communications System (UMTS), and/or Long-term Evolution (LTE) cellular wireless base station; a Worldwide Interoperability for Microwave Access (WiMAX) base station; a WiFi access point; a femtocell; or other wireless access devices. While FIG. 1 depicts only one base transceiver station 122, in an embodiment, a plurality of base transceiver stations may be existent and in operation.

Figure 2:
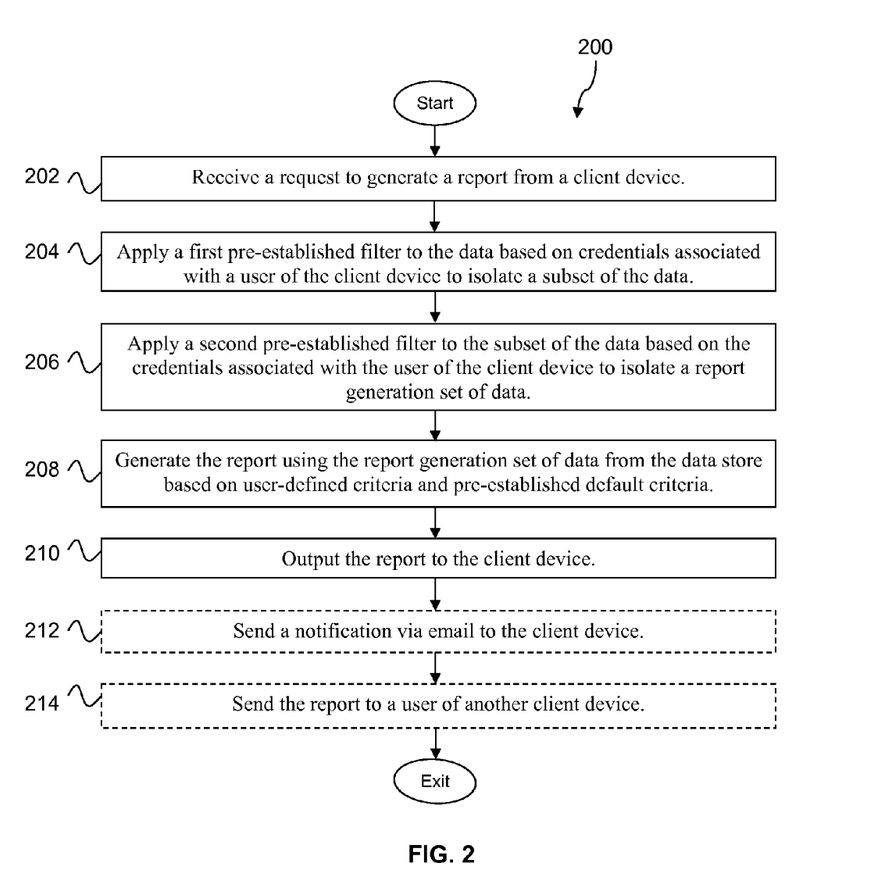
FIG. 2 is a flow chart of a method for generating a report according to an embodiment of the disclosure.

Turning now to FIG. 2, a method 200 for generating a report is described. At block 202, a reporting engine 114 receives a request to generate a report from a client device 108a, 108b, or 108m. At block 204, the reporting engine 114 applies a first pre-established filter to data 106 in data store 104 based on credentials associated with a user of the requesting client device 108a, 108b, or 108m to isolate a subset of the data 106.

At block 206, the reporting engine 114 applies a second pre-established filter to the subset of the data based on the credentials associated with the user of the requesting client device 108a, 108b, or 108m to isolate a report generation set of data. The second pre-established filter defines or isolates what data from the subset created by applying the first pre-established filter is able to be accessed by the requesting client device 108a, 108b, or 108m and/or returned in the report. In an embodiment, the reporting engine 114 uses the user's Windows authentication as the credentials used to determine which pre-established filters to apply to the data 106 in the data store 104 to isolate the report generation set of data.

As described above, the reporting engine 114 applies the two-tiered filtering to the data 106 stored in data store 104, which is loaded from the data generators 102 in near real time, and the data 106 is used by the reporting engine 114 to generate reports. Therefore, the data in the generated reports is more current than in traditional systems where the data from the data store is cached in a file, the file is updated with data from the data store relatively infrequently, and reports are generated using the cached data in the file, thereby resulting in increased customer satisfaction.

At block 208, the reporting engine 114 generates the report using the report generation set of data from the data store 104 based on user-defined criteria and pre-established default criteria. In an embodiment, user-defined criteria may be inputted by a user of one of the client devices 108 via the corresponding user interface 110. As discussed above, user-defined criteria may comprise a format of the report (e.g., Excel, Word, PDF, etc.), a date range, a start date, an end date, or other criteria. In an embodiment, the pre-established default criteria are created by a system administrator. The pre-established default criteria may comprise 100,000 rows of data or less in the generated report and/or thirty minutes or less of processing time to generate the report. In an embodiment, the pre-established default criteria are applied to enable the reporting engine 114 to function more smoothly and efficiently than traditional systems that did not impose such processing constraints on the generation of reports.

At block 210, the reporting engine 114 outputs the report to the requesting client device 108a, 108b, or 108m. At block 212, the reporting engine 114 optionally sends a notification via email to the requesting client device 108a, 108b, or 108m. The notification may comprise a link to the generated report.

At block 214, the requesting client device 108a, 108b, or 108m optionally sends the generated report to a user of another device. For example, using the corresponding interface 110, a user of the requesting client device 108a, 108b, or 108m may indicate one or more individuals with which to share the generated report. Also, using the corresponding interface 110, the user of the requesting client device 108a, 108b, or 108m may indicate the access rights that the one or more individuals has to the sent report. Access rights may comprise read/write access or read only access. The ability to share the generated report with other individuals or client devices may avoid regeneration of reports, thereby reducing the processing load placed on the report generation system 100.

Figure 3:
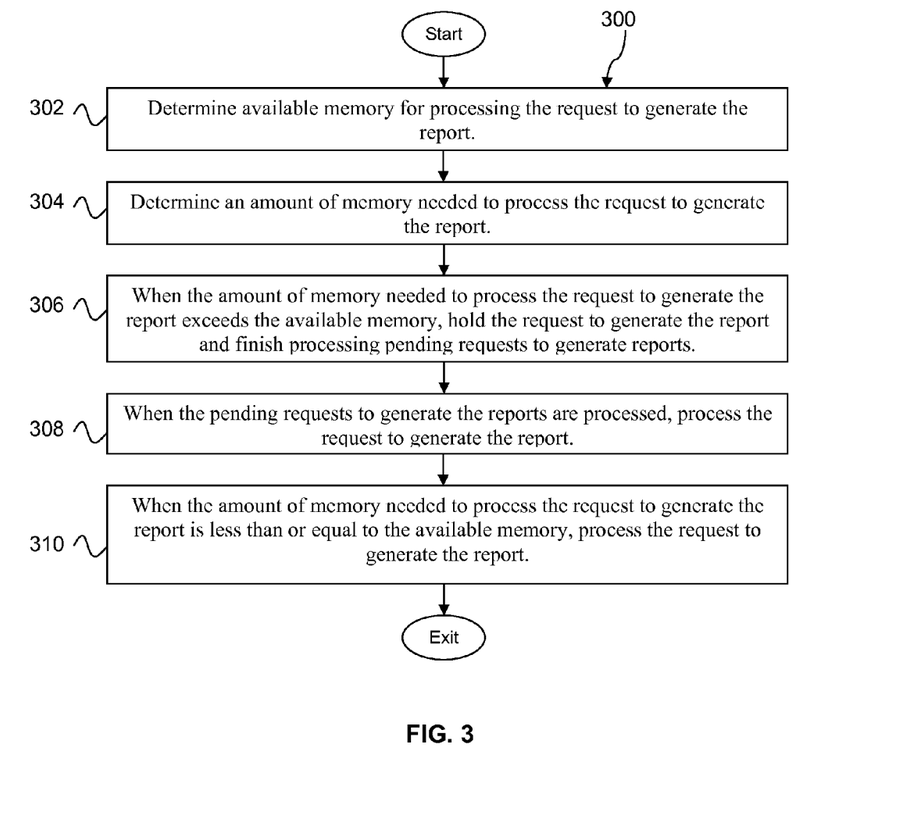
FIG. 3 is a flow chart of a method for performing a memory check according to an embodiment of the disclosure.

Turning now to FIG. 3, a method 300 for performing a memory check is described. While illustrated as a separate flowchart, the method 300 may be used in combination with the method 200 illustrated FIG. 2. For example, blocks 302-310 of FIG. 3 may be performed by the reporting engine 114 prior to the actual generation of the report (i.e., block 208 of FIG. 2).

At block 302, the reporting engine 114 determines the available memory for processing the request to generate the report. At block 304, the reporting engine 114 determines and/or estimates an amount of memory needed to process the request to generate the report. The estimate may be determined based on assessing the number of lines of data to be processed. The estimate may further be determined based in part on historical data of processing times.

At block 306, when the amount of memory needed to process the request to generate the report exceeds the available memory, the reporting engine 114 holds the request to generate the report and finishes processing pending requests to generate reports. At block 308, when the pending requests to generate the reports are processed, the reporting engine 114 processes the request to generate the report. At block 310, when the amount of memory needed to process the request to generate the report is less than or equal to the available memory, the reporting engine 114 processes the request to generate the report. Implementing a memory check prior to processing a request to generate a report may also help to keep the report generation system 100 operating smoothly and efficiently.

Figure 4:
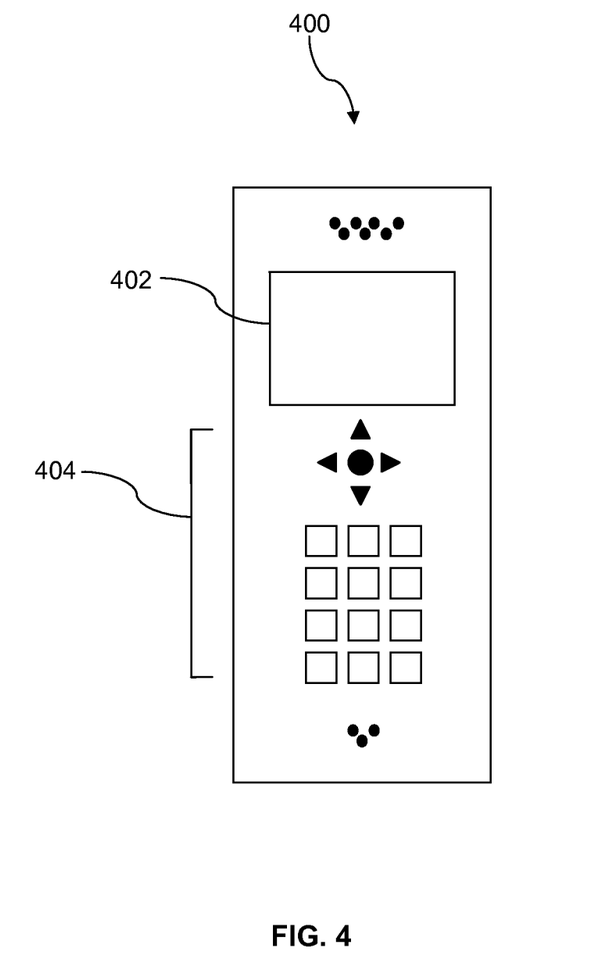
FIG. 4 is an illustration of an exemplary electronic device according to an embodiment of the disclosure.

FIG. 4 shows a mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
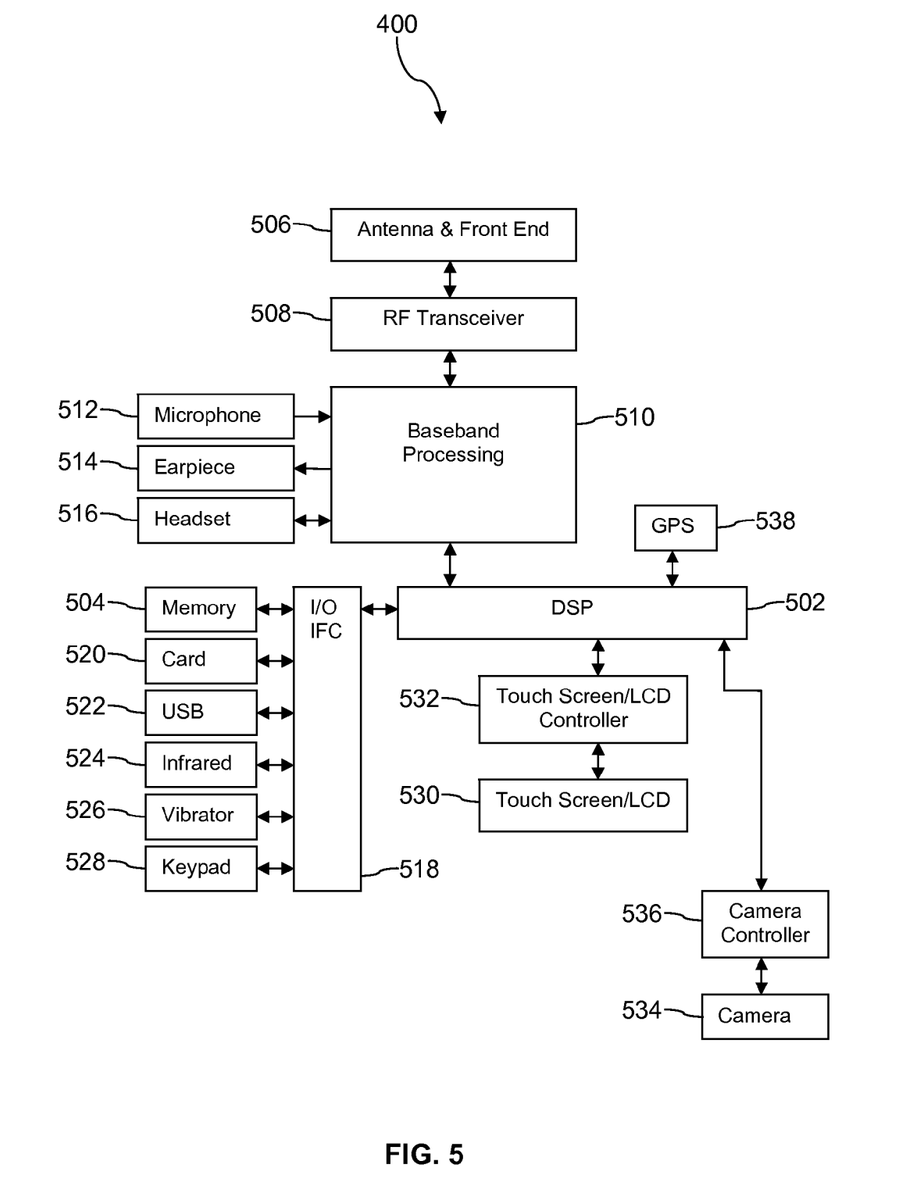
FIG. 5 is a block diagram of a hardware architecture of an electronic device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
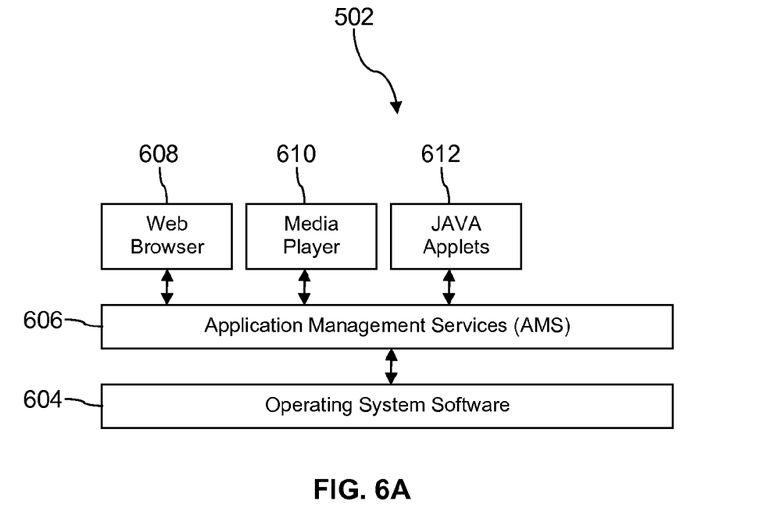
FIG. 6A is a block diagram of a software architecture of an electronic device according to an embodiment of the disclosure.

FIG. 6A illustrates a software environment 502 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
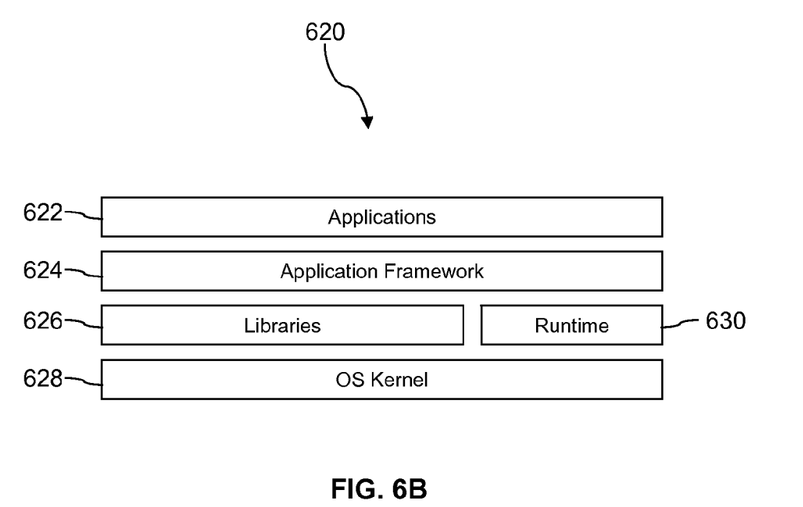
FIG. 6B is a block diagram of another software architecture of an electronic device according to an embodiment of the disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
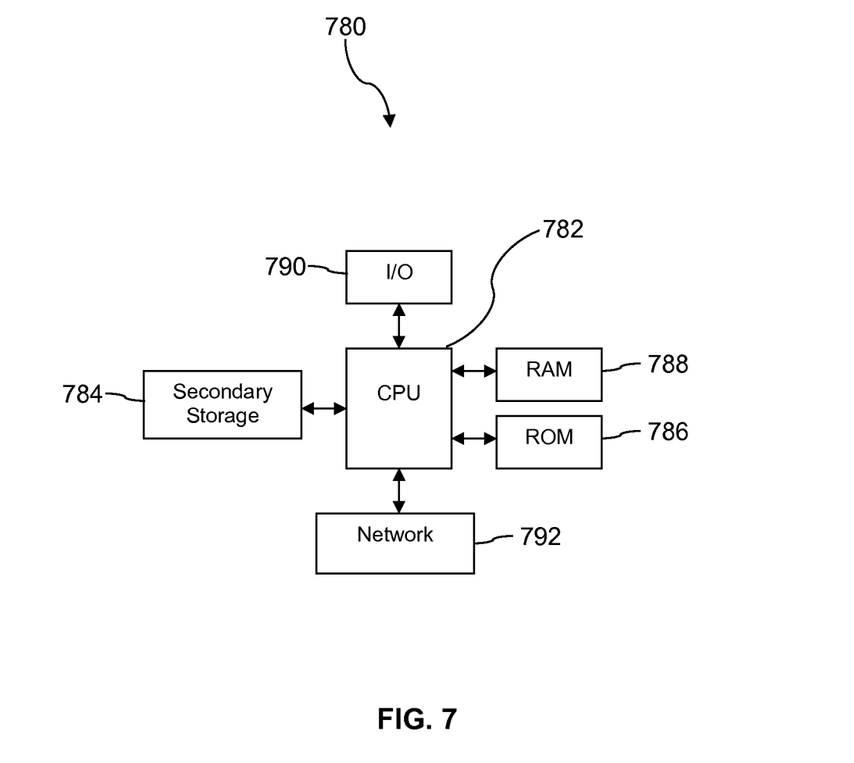
FIG. 7 is a block diagram of a computer system according to an embodiment of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A report generation system, comprising:
   at least one data generator that generates data;
   a data store that comprises the data;
   a computer system that comprises at least one memory and at least one processor; and
   a reporting engine stored in the at least one memory that, when executed by the at least one processor;
   receives a request to generate a report from a client device;
   applies a first pre-established filter to the data based on credentials associated with a user of the client device to isolate a subset of the data, wherein the isolation of the subset of the data comprises excluding at least some of the data in the data store based on the credentials associated with the user of the client device;
   applies a second pre-established filter to the subset of the data based on the credentials associated with the user of the client device to isolate a report generation set of data, wherein the report generation set of data is another subset of the subset of the data;
   determines available memory for processing the request to generate the report,
   determines an amount of memory needed to process the request to generate the report,
   when the amount of memory needed to process the request to generate the report exceeds the available memory, delays the request to generate the report and finishes processing pending requests to generate reports,
   when the pending requests to generate the reports are processed, processes the request to generate the report,
   when the amount of memory needed to process the request to generate the report is less than or equal to the available memory, processes the request to generate the report,
   generates the report using the report generation set of data from the data store based on user-defined criteria and pre-established default criteria, wherein the pre-established default criteria comprise 100,000 rows of data or less in the generated report and thirty minutes or less of processing time to generate the report, and wherein the user defined criteria comprises a format of the report, the format of the report comprising one of Excel, Word, or Portable Document File (PDF), and outputs the report to the client device.

2. The report generation system of claim 1, wherein the client device is one of a desktop computer, laptop computer, tablet computer, mobile telephone, personal digital assistant (PDA), and portable electronic device.

3. The report generation system of claim 1, wherein the request to generate the report is sent to the reporting engine in response to a schedule set by the user of the client device or an ad hoc request of the user of the client device.

4. The report generation system of claim 1, wherein the data generated by the at least one data generator is loaded to the data store in near real time.

5. The report generation system of claim 4, wherein near real time is fifteen minutes or less.

6. The report generation system of claim 1, wherein the first and second pre-established filters are based on the user's position in an enterprise.

7. The report generation system of claim 1, wherein the first and second pre-established filters are based on whether the user is an enterprise employee or a vendor employee.

8. The report generation system of claim 1, wherein the credentials associated with the user comprise one of a Windows authentication, ID, or password.

9. The report generation system of claim 1, wherein the user-defined criteria further comprises a date range, a start date, or an end date.

10. The report generation system of claim 1, wherein the report engine, when executed by the at least one processor, further sends a notification via email to the client device, the notification comprising a link to the report.

11. The report generation system of claim 1, wherein the client device is configured to send the report to a user of another client device, and wherein the user of the client device indicates access rights that the user of the other client device has to the report, and wherein the access rights comprise one of read/write and read only.

12. A computer-implemented method for generating a report, comprising:

receiving, by a reporting engine stored in at least one non-transitory computer readable medium and executable by at least one processor, a request to generate a report from a client device;

applying, by the reporting engine, a first pre-established filter to data in a data store based on credentials associated with a user of the client device to isolate a subset of the data, wherein the isolation of the subset of the data comprises excluding at least some of the data in the data store based on the credentials associated with the user of the client device;

applying, by the reporting engine, a second pre-established filter to the subset of the data based on the credentials associated with the user of the client device to isolate a report generation set of data, wherein the report generation set of data is another subset of the subset of the data;

determining, by the reporting engine, available memory for processing the request to generate the report;

determining, by the reporting engine, an amount of memory needed to process the request to generate the report;

when the amount of memory needed to process the request to generate the report exceeds the available memory, delaying, by the reporting engine, the request to generate the report and finishing processing, by the reporting engine, pending requests to generate reports;

when the pending requests to generate the reports are processed, processing, by the reporting engine, the request to generate the report;

when the amount of memory needed to process the request to generate the report is less than or equal to the available memory, processing, by the reporting engine, the request to generate the report;

generating, by the reporting engine, the report using the report generation set of data from the data store based on user-defined criteria and pre-established default criteria, wherein the pre-established default criteria comprise 100,000 rows of data or less in the generated report and thirty minutes or less of processing time to generate the report, and wherein the user defined criteria comprises a format of the report, the format of the report comprising one of Excel, Word, or Portable Document File (PDF); and outputting, by the reporting engine, the report to the client device.

13. The computer-implemented method of claim 12, wherein the data is loaded to the data store in near real time.

14. The computer-implemented method of claim 12, wherein the credentials associated with the user comprise one of a Windows authentication, ID, or password.

15. The computer-implemented method of claim 12, further comprising sending, by the report engine, a notification via email to the client device, wherein the notification comprises a link to the report.

16. The computer-implemented method of claim 12, further comprising sending, by the client device, the report to a user of another client device, wherein the user of the other client device has read/write access or read only access to the report, and wherein the read/write access or the read only access is determined by the user of the client device.

17. A report generation system, comprising:

at least one data generator that generates data;

a data store that comprises the data;

a computer system that comprises at least one memory and at least one processor; and a reporting engine stored in the at least one memory that, when executed by the at least one processor, receives a request to generate a report from a client device, applies a plurality of pre-established filters to the data based on credentials associated with a user of the client device to isolate a report generation set of data, wherein the isolation of the report generation set of data comprises excluding at least some of the data in the data store based on the credentials associated with the user of the client device, determines available memory for processing the request to generate the report, determines an amount of memory needed to process the request to generate the report, when the amount of memory needed to process the request to generate the report exceeds the available memory, delays the request to generate the report and finishes processing pending requests to generate reports, when the pending requests to generate the reports are processed, processes the request to generate the report, when the amount of memory needed to process the request to generate the report is less than or equal to the available memory, processes the request to generate the report, generates the report using the report generation set of data from the data store based on user-defined criteria and pre-established default criteria, wherein the pre-established default criteria comprise 100,000 rows of data or less in the generated report and thirty minutes or less of processing time to generate the report, and wherein the user defined criteria comprises a format of the report, the format of the report comprising one of Excel, Word, or Portable Document File (PDF), and outputs the report to the client device.

18. The report generation system of claim 17, wherein the client device is one of a desktop computer, laptop computer, tablet computer, mobile telephone, personal digital assistant (PDA), and portable electronic device.

19. The report generation system of claim 17, wherein the request to generate the report is sent to the reporting engine in response to one of a schedule set by the user of the client device and an ad hoc request of the user of the client device.

20. The report generation system of claim 17, wherein the credentials associated with the user comprise one of a Windows authentication, ID, or password.

* * * * *